R. E. TULLOSS.
MEASURING INSTRUMENT.
APPLICATION FILED JUNE 25, 1917.

1,253,305.

Patented Jan. 15, 1918.
3 SHEETS—SHEET 1.

Inventor
Rees E. Tulloss,
Toulmin & Toulmin,
Attorneys.

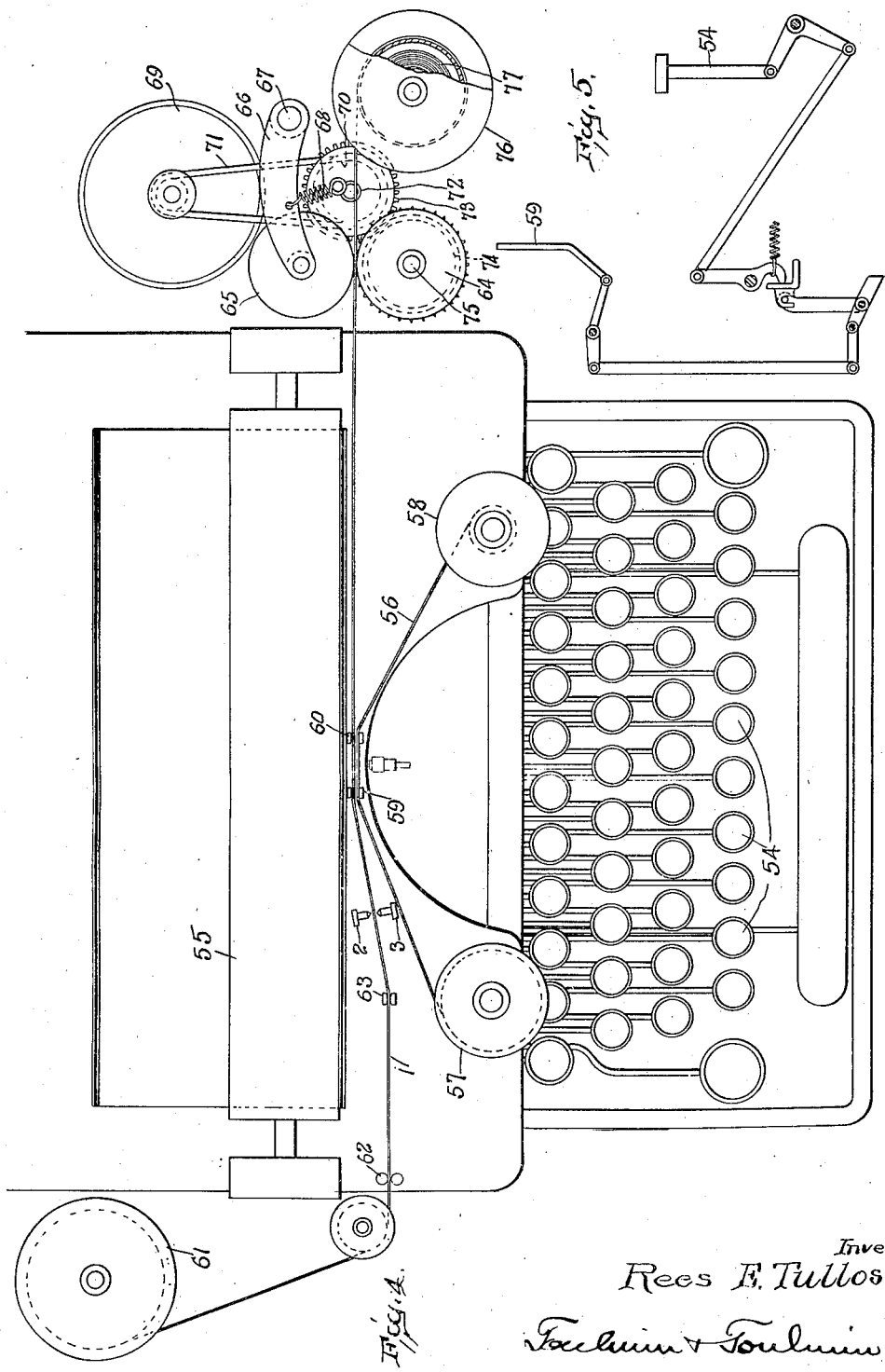

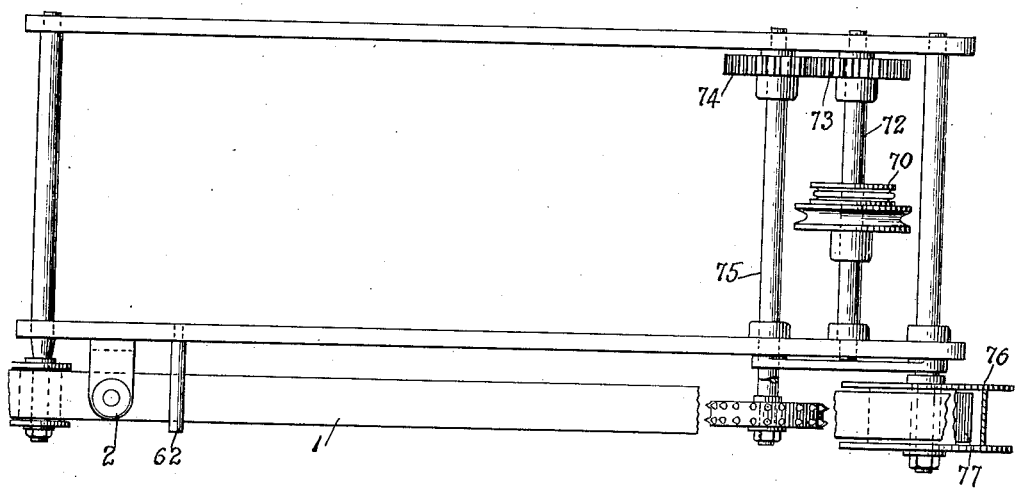
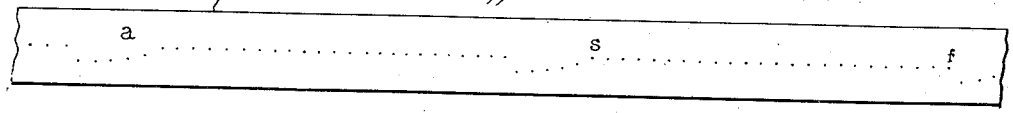
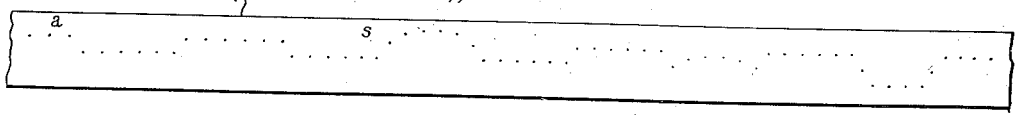
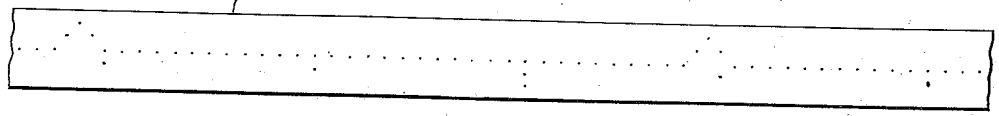
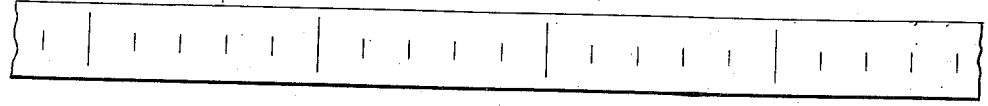

UNITED STATES PATENT OFFICE.

REES E. TULLOSS, OF CAMBRIDGE, MASSACHUSETTS.

MEASURING INSTRUMENT.

1,253,305.

Specification of Letters Patent.    Patented Jan. 15, 1918.

Application filed June 25, 1917. Serial No. 176,913.

*To all whom it may concern:*

Be it known that I, REES E. TULLOSS, a citizen of the United States, residing at Cambridge, in the county of Middlesex and State of Massachusetts, have invented certain new and useful Improvements in Measuring Instruments, of which the following is a specification, reference being had therein to the accompanying drawing.

This invention relates to measuring instruments and has for its object the provision of an improved mechanism or system for measuring reaction times or the duration of other events, or the intervals between them.

It provides a device whereby a plurality of measurements can be made in rapid succession and the measurements read and analyzed after a series of them are made.

In particular it provides a measuring device especially adapted for use in connection with typewriting machines to measure and make records of the exact times of depression of the typewriter keys. However, this is only one of the many possible fields of use of the device.

An additional object is to provide a measuring device whereby closely consecutive electric sparks are caused to puncture or pierce a record tape and thereby render possible the making of a record of a plurality of reactions or other observations on this record tape.

A further object is to improve such measuring or time recording devices by providing means by which the exact duration of any manual operation can be obtained and to obtain curves or the like on the record indicating the speed of operations at different parts thereof.

An additional object is to provide a practical method of developing the speed of writing of persons operating typewriting machines. It is found by observation and experience that the average person finds a difficulty in certain particular combinations of letters or words in a typewriter and this device is well adapted to show what particular combinations are difficult, whereby they can be especially practised and the difficulty in making the particular combination be thereby corrected.

In the accompanying drawings which in general are diagrammatic and merely illustrative in character, Figure 1 is a diagram of a marking system whereby a series of closely consecutive records of elapsed time are made on a record tape;

Fig. 4 is a general view illustrating the attachment of the recording mechanism to the typewriter;

Fig. 5 is a detail showing the construction of some of the parts in Fig. 4;

Fig. 6 is a plan view of the paper feeding device also shown in Fig. 4;

Figure 1:
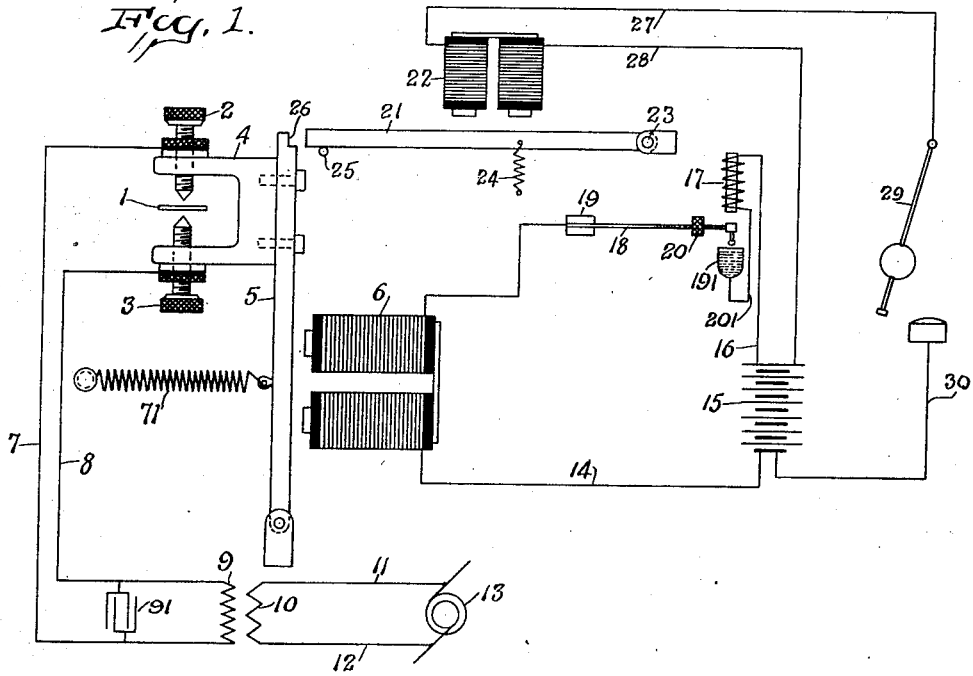
Figure 2:
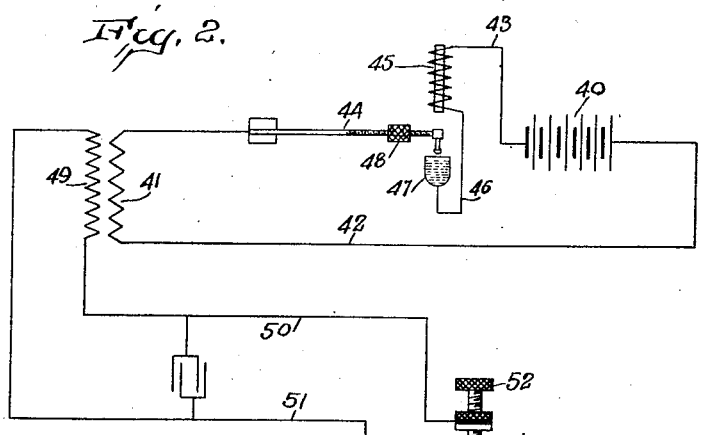
Fig. 2 shows a different method of obtaining such records where the times to be measured are not so small.
Figure 3:
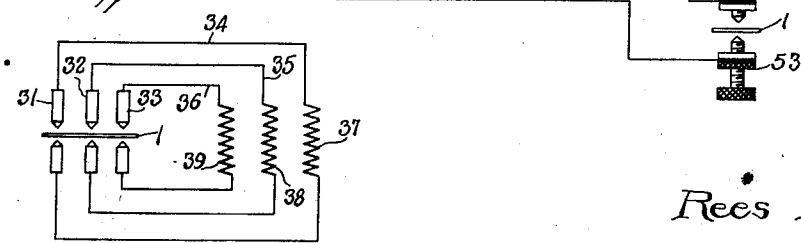
Fig. 3 shows a diagram of a different form of device having the same general capacity as to accuracy as Fig. 1.

Figs. 7 to 10, inclusive, are diagrams of different forms of record tape, Fig. 7 being a form produced by the recording system shown in Fig. 2, Fig. 8 by the system of Fig. 1, Fig. 9 by the system of Fig. 3, and Fig. 10 shows a previously marked tape adaptable to use in similar relations.

The system in general provides a means for making closely consecutive time indications on a record strip which is driven at a uniform rate. It is also possible to make manually controlled records on the moving strip of any desired operation under observation whereby the exact time and duration of the thing observed may be obtained. In particular the system provides for puncturing the record tape at a very rapid rate by an electric spark, this method having the advantage that it is frictionless and that therefore it does not at all retard the paper. It is also desirable to make the sparks very closely consecutive whereby extremely minute periods of time of operations may be accurately measured.

There are in general three different methods of producing the time indications shown in Figs. 1, 2 and 3 and of these the systems of Figs. 1 and 3 have substantially the same amount of accuracy of observation, whereas the system of Fig. 2 is not so well adapted for measuring very small periods of duration of time.

Referring now to the drawings, Fig. 1 shows a record tape 1 adapted to pass between spark terminals 2 and 3. These terminals may be of any desired material but I have found that tungsten steel is very satisfactory due to its extremely high melting point. As shown, the terminals 2 and 3 are carried in a frame 4 having the general form of a yoke which is fast to the armature 5 of an electromagnet 6. As shown a spring 71 is provided to restore the armature to its back stop after it has been attracted by the magnet.

To cause sparks to pass between the terminals 2 and 3 they are connected by wires 7 and 8 to the secondary 9 of an induction coil or transformer. If desired a condenser 91 may be shunted across wires 7 and 8 to improve the penetrating qualities of the spark. The primary 10 of the induction coil may be connected as shown by line wires 11 and 12 to an alternating current generator 13. In fact the line wires 11 and 12 may, if desired, be connected to the ordinary alternating lighting circuit supply of the central stations. It will be seen that if current, say of sixty cycles, is supplied over line wires 11 and 12 the sparks will penetrate the record tape 1 at the rate of 120 per second inasmuch as there are 120 reversals per second of the line current. I have found by experiment that the alternating current supplied from a well regulated central station will not vary in frequency more than about 1 per cent. and for most types of observation this is a sufficiently close regulation.

The electromagnet 6 is shown as connected by a wire 14 to one terminal of a battery 15, the other terminal of which connects by a wire 16 to a vibrating device here shown as a bar dipping into a mercury cup. The wire 16 runs to a magnet 17 which serves to attract a spring bar 18 fast in a clamp 19 and having an adjustable weight 20 whereby its frequency of vibration may be regulated. As shown the spring bar 18 dips into a mercury cup 191 having a wire 201 which leads therefrom to the magnet coil 17. It will be readily seen from this construction that the vibration of spring bar 18 will continue at a constant rate as the circuit including the magnet 6 and the bar 18 is complete when the bar dips into the mercury cup. The completion of the circuit energizes the magnet 17 and thereby attracts the spring bar, causing it to move out of the mercury and thus break the circuit. Clearly this operation will continue at a constant rate, which rate may be controlled and varied by the adjustable weight 20, or by varying the length of the vibrating spring, by means of the clamp 19. Therefore, the armature 5 of the electromagnet 6 is vibrated at equal and easily regulated intervals. At each vibration the spark terminals are moved slightly across the paper tape and therefore the sparks puncturing the tape will then be in a different part relatively to the width of the tape.

As the parts are shown in Fig. 1 the armature 5 is prevented from making a complete stroke by a second armature 21 controlled by a second magnet 22. This armature may be pivoted at 23 and have a spring 24 tending to draw it against a stop 25. The upper part of armature 5 is notched at 26 and when the armature 5 is attracted by magnet 6 it will move until the notch 26 strikes the end of the second armature 21 and will be stopped thereby. Clearly, if the magnet 22 is energized and its armature 21 therefore lifted the armature 5 of magnet 6 may then make an extra long stroke until it is stopped by the stop 25 common to both armatures.

In order to energize the magnet 22 it is connected by wires 27 and 28, respectively, to a time controlling device, such as a pendulum 29 and to one terminal of the battery 15. The other terminal of the battery is connected by a wire 30 to a mercury cup into which the end of the pendulum 29 is adapted to dip at each vibration. Clearly the circuit from the battery through the magnet 22 will be complete each time the pendulum dips into the mercury cup and when the magnet 22 is thus energized its armature 21 will be elevated out of the path of the armature 5 and thus move the spark terminals 2 and 3 to an extent greater than before.

It will be understood that the particular time controlling mechanisms shown in this figure as a spring bar 18 and a pendulum 29 are merely illustrative and that other devices may be employed. The only requisite is that devices having different periods be employed, one considerably more rapid than the other, whereby a complete time marking may be obtained on the record strip.

The particular type of record made by the device of Fig. 1 is shown in Fig. 8. In this figure the letters "a" and "s" may be temporarily disregarded and reference be made only to the dots which indicate the piercings or puncturings through the record strip. It will be seen that the space between any pair of dots indicates the amount of tape moved in 120th of a second or in whatever time is fixed as the basis of the system. At the end of 6/120ths of a second the magnet 6 is energized and the line of spark piercings thereby depressed because of the movement of the spark terminals 2 and 3 laterally of the record strip. This occurs a number of times in succession and then toward the right of Fig. 8 is seen the effect produced by the energizing of the magnet 22. This magnet 22 when energized permits an extra movement of the armature 5, thereby carrying the spark terminals farther laterally over the record strip, thus causing the line of spark dots to appear on a line near the lower side of the record tape. The operation of the magnet 22 may occur once per second or per half second and the operation of the magnet 6 once every 10th of a second, for example, and thereby the time readily obtained from the position of the spark piercings in the record tape.

The construction shown in Fig. 3 provides substantially the accuracy of measurement of the system in Fig. 1. In this Fig. 3 sets of spark terminals are provided numbered respectively 31, 32 and 33. These terminals are shown as connected by wires 34, 35 and 36 to the secondaries of induction coils 37, 38 and 39. It will be seen that by connecting the primaries corresponding to the secondaries of the induction coils shown to devices for sending electrical impulses of various frequencies through the primaries that sparks are caused to pass between the pairs of terminals 31, 32 and 33 at different rates of interval between successive sparks. One method of obtaining such a series of sparks is shown in Fig. 2 wherein a battery 40 is connected to the primary 41 of an induction coil through wires 42 and 43. The wire 43 connects to the primary 41 through a spring device 44 which may be substantially similar to the spring device 18 of Fig. 1. It is operated by a magnet coil 45 connected by a wire 46 to a mercury cup 47. Clearly, the spring 44 when set into vibration will cause impulses to pass with exact frequency through the primary 41 of the induction coil and this frequency may be readily regulated by changing a weight 48 adjustably carried by spring 44. The secondary 49 of the induction coil is connected through wires 50 and 51 to spark terminals 52 and 53 and a condenser may be shunted across the wires 50 and 51, as shown. The secondary 49 of Fig. 2 may take the place of any of the induction coil secondaries 37, 38 and 39 of Fig. 3 and to operate the other two of these induction coil secondaries a construction substantially similar to that of Fig. 2 but employing the pendulum 29 of Fig. 1 in place of the spring bar 44 may be supplied or one of the secondaries of Fig. 3 may be controlled as is the secondary 9 of Fig. 1.

It will be seen that the construction of Fig. 2 is adapted to cause a series of sparks to pierce the record tape at regular intervals but the sparks are not as closely consecutive as are the sparks of Fig. 1. On the other hand the record made by the device of Fig. 3 provides for measuring as small intervals as does that of Fig. 1.

The record made by the system of Fig. 2 is shown in diagrammatic Fig. 7 wherein a series of dots indicate the piercings of the paper by electric sparks and the intervals between two successive sparks may conveniently be 1/10th of a second. The diagrammatic Fig. 9 shows the type of record made by the system of Fig. 3. Here the line of spark piercings may be made at the rate of 120 spark holes per second and every 1/10th of a second a second spark beside the first may indicate the elapsed 1/10th of a second. Near the center of Fig. 9 will be observed the third spark hole in a vertical line and this may be caused, for example, by spark terminals 33 of Fig. 3 and sparks may pass between these terminals at the rate of one per second.

It will be noted that in Figs. 7, 8 and 9 there are shown spark piercings in positions not accounted for by the systems of 1, 2 and 3, inclusive, and it will be understood that these are caused by the occurrence of the observations which are to be made. The method of making these observations will be clear after the parts shown in Fig. 4 are described.

Referring now to Figs. 4 to 6, inclusive, these show one of the adaptations of the recording systems of Figs. 1 to 3 and, as shown, the device is attached to a typewriter which may be of any usual form. The construction of the typewriter is no part of this invention and therefore no parts of it are shown except those which are directly connected with the recording mechanism. The keys 54 are constructed as usual to operate the letter carrying types which strike the platen 55. The usual inking ribbon 56 is carried around ribbon spools 57 and 58 and passes through a ribbon guide 59. As shown in Fig. 4, this ribbon guide is directly in front of and closely adjacent to the rotary platen 55 and in order that the impression made by the letter key on the paper may be visible the ribbon guide is arranged to be moved vertically at each operation of any of the keys 54. This vertical movement of the ribbon guide is customary in typewriters and is somewhat conventionally shown in Fig. 5 where the keys 54 are shown as being connected to the ribbon guide 59 to elevate it.

This ribbon guide 59, in the present instance, is provided with an extra pair of projections 60 and between these projections 60 and the usual parts of the guide 59 the record tape 1 is adapted to move. This tape may be carried on a roll 61 and be guided by pins 62 and by any form of tape guide 63. I have found that it is desirable to have such a guide as 63 in fairly close proximity to the spark terminals 2 and 3 so as to insure the proper guiding of the tape 1. The tape 1 after passing through the ribbon guide 59 goes to a paper feeding device including a driving wheel 64. This wheel is provided with two sets of teeth, as shown best in Fig. 6, these teeth pressing into but not perforating the record strip. This wheel 64 is directly under the tape 1 and the tape is pressed against the driving wheel by an idler wheel or roller 65 carried on an arm 66 pivoted at 67 and pressed by a spring 68 against the toothed wheel 64. A motor 69 may be arranged to drive a grooved wheel 70, as for example through a belt 71, the grooved wheel being mounted on a shaft 72 carrying a gear wheel 73 meshing with a larger gear 74 fast on a shaft 75 which also carries the toothed driving wheel 64. As shown, the grooved driving pulley 70 may be made with two grooves of different radius whereby varying speeds of the feeding mechanism may be obtained. The type of motor 69 used is not part of the invention, but I have found that a constant speed motor running on the ordinary central station lighting current is very satisfactory. This type of device provides a regulation in speed within probably one per cent. and if closer regulation is desired some type of governor for the motor may be employed, for example, the type which shunts the motor circuit if the speed increases slightly.

After passing between the driving wheel 64 and the idler wheel 65 the tape passes to a winding roller 76 which may have a coiled spring 77 therein for keeping the paper tight and for winding it. It will be seen that some of the driving force may be supplied by the coiled spring and the winding roller 76.

The diagrammatic Figs. 7 to 10, inclusive, may now be again referred to and the effect of the typewriter keys on the record tape understood. As before stated the operation of any of the typewriter keys serves to elevate the ribbon guide to the printing point of the type carrier and also to strike the type carrier against the ribbon and thereby make an impression on the record tape 1.

Referring to Fig. 7 which shows the form of record made by the device of Fig. 2 it will be seen that when the typewriter key is operated the record tape 1 is shifted laterally and the next few spark punctures are out of regular line. These spark punctures indicate really the position of the paper guide at the precise instant and thereby they indicate the speed of operation of the typewriter key. It will be noted that letters appear just above the line of spark punctures in these figures and it will be understood that they are the impressions made by the type lever of the typewriter when it is thrown against the paper by the key. With the form of device shown in Fig. 4 the spark terminals are somewhat to the left of the paper guide and therefore the spark punctures which are out of the regular line and which therefore represent the operations of the typewriter are not exactly alined with the letter impression. However, there is no difficulty in any case in determining which group of spark punctures apply to the several type letters.

The diagrammatic Fig. 8 shows the type of record made by the system of Fig. 1. Here again the letters shown on the record tape are made by the typewriter key and the precise time at which each key was struck is readily found from the position of the spark punctures in the record strip. Fig. 8 shows two printed letters and two corresponding groups of spark punctures, one made while the spark terminals are in what may be termed their normal position and the other made at the instant the magnet 6 has been energized to move the spark terminals through part of their larger extent of movement. It will be understood that if the typewriter key was struck at the instant the magnet 22 was energized and therefore when the armature 5 of magnet 6 had its greater stroke the spark punctures out of the regular line would have been near the extreme right of Fig. 8 and in connection with the lowest group of spark punctures there shown.

The diagrammatic Fig. 9 shows the type of record made by the apparatus of Fig. 3. Here the spark terminals 31, 32 and 33 are not moved laterally of the record strip as is the case of the device shown in Fig. 1 and therefore the line of spark punctures would be continuously straight. However, at two points on this figure the spark punctures are out of the regular line and this is evidently caused by the typewriter key having been struck and the paper guide thereby elevated.

The diagram in Fig. 10 has no markings placed on it but its use will be obvious from the previous description. If letters printed by the typewriter keys appeared on this record the distance between such letters would be proportional to the time intervening between their being struck and therefore the necessary deductions as to correctness of operations may be as readily made as with the other forms of record. The form of Fig. 10 is the simplest in its accompanying machine construction for the reason that the spark terminals and their controlling devices are not necessary. On the other hand the system employing such a record as Fig. 10 is not as accurate as the other systems as the speed of the paper passing is the only way of determining the speed of the operations being measured, or of other operations the durations or intervals of which are to be measured. With the forms of Figs. 7, 8 and 9 there is an independent device indicating the precise time of operation of the typewriter key and this does not depend at all upon the paper being fed at a uniform speed.

It will be seen that the device described and the various forms thereof are well adapted to secure the advantages before set out and to accomplish the objects claimed. The system while shown in connection with a typewriter is not at all limited to use with that type of device as it will be evident that the spark puncturing and feeding devices for the record tape may readily be employed with many other types of manually operated elements, the operation of which is to be observed. The device is adapted to measure time as close as 1/1000th of a second and the accuracy with which observations may be made depends of course on the speed of the record tape.

I have found by experiment that it is possible to move such a tape at a speed of two meters per second and with this speed an interval is readily measurable with accuracy within 1/1000th of a second, even 1/5000th of a second. As the record tape may be obtained in lengths of 500 feet it is evident that a large number of observations may be made and then analyzed at the operator's leisure. The succession of spark punctures take place with great regularity and does not at all delay or change the paper feed. It is difficult to get a mechanism to feed a record tape with the accuracy required by some types of observation, but the spark punctures can be made to occur at absolutely the same intervals.

The device is particularly applicable to typewriters and serves to enable operators to determine the difficulties of their obtaining greater speed and therefore enables them to practice the particular combinations of letters which they find to be difficult. For example, the device may be readily used in a school of typewriting by making tests of the students at regular intervals and thereby determining the precise increases of speed which they obtain, and their points of difficulty.

In most cases the constant speed motor will serve to move the paper at a sufficiently accurate rate, but, of course, a governor may be employed to regulate the speed of the motor and if some other form than an electric motor is used this governor may well be of the type used in the phonographs now commercially on the market.

The separate indications of 1/10th of seconds and seconds in the forms shown in Figs. 1 and 3 in producing the records shown in Figs. 8 and 9 are of advantage in that they give an additional check on the time and serve to determine any variations in spark timing or the paper speed.

In the timing of operations other than that of typewriting the beginning and ending of the period or periods to be measured, may be indicated by moving the tape slightly in the lateral direction, either by mechanical or electrical means; or by moving the spark terminals slightly in a direction lateral to the paper tape; in either of which cases the general form of the record will be similar to that shown in Fig. 7 and the upper line of perforations in Fig. 9. Or, the limits of the period or periods to be measured may be indicated by spark-perforations from one of the pairs of spark terminals shown in Fig. 3; the record in this case being somewhat similar to that shown in Fig. 9, where the lower dots would indicate the limits of the periods to be measured.

Having thus fully described my invention, what I claim as new and desire to secure by Letters Patent, is:—

1. In a measuring apparatus, means for uniformly feeding a record tape in the direction of its length, devices for making time indications on said tape, and manually operated means for moving the portion of said tape adjacent said time indication devices at an angle to the direction of its length.

2. In a measuring apparatus, means for uniformly feeding a record tape in the direction of its length, manually operated devices for moving a portion of said tape at an angle to the direction of its length, and means adjacent said manually operated devices constructed to indicate on said tape the time at which each portion of the tape is acted on by said manually operated devices.

3. In a measuring apparatus, means for uniformly feeding a record tape in the direction of its length, manually operated devices for moving the portion of said tape adjacent said devices at an angle to the direction of its uniform feeding movement, and means for making on said tape a record of the time at which such movement at an angle to its feeding movement occurs.

4. In a measuring apparatus, means for uniformly feeding a record tape in one direction, manually operated devices for moving a portion of said tape at an angle to its uniform feeding movement, and means for making on said tape a record of the time at which such movement at an angle occurs.

5. In a measuring apparatus, means for uniformly feeding a record tape in the direction of its length, manually operated devices for moving a portion of said tape at an angle to its uniform feeding movement, and means for making on said tape a record of the time at which each portion thereof passes said manually operated devices.

6. In a measuring apparatus, a motor mechanism constructed to feed a record tape at a constant speed in one direction, manually operated devices constructed to move a portion of said tape in another direction, and means for making a series of indications on said tape in another direction, and means for making a series of indications on said tape of the time at which each manually operated movement of said tape occurs.

7. In a measuring apparatus, means for feeding a record tape at a uniform rate in the direction of its length, a guide for said tape constructed to be manually moved and thereby carry the adjacent portion of said tape at an angle to the direction of its uniform movement, and regularly operated means for making a series of time indications on said tape.

8. In a measuring apparatus, means for feeding a record tape at a uniform rate, manually operated devices for moving a portion of said tape at an angle to its uniform movement, and electrically operated means for regularly making a series of time indications on said tape.

9. In a measuring apparatus, a motor mechanism constructed to feed a record tape at a uniform rate, a guide for said tape, means, such as a typewriter key, for moving said guide and thereby carrying a portion of said tape at an angle to its uniform movement, and electrically operated devices for regularly making a series of time indications on said tape.

10. In a measuring apparatus, means for feeding a record tape at a uniform rate in the direction of its length, a guide for said tape, means, such as a typewriter key, for moving said guide and thereby giving a portion of said tape a movement at an angle to the direction of its uniform movement, and means for regularly making a closely consecutive series of time indications on said tape.

11. In a measuring apparatus, a motor mechanism including a feed wheel constructed to feed a record tape at a uniform rate in one direction, an apertured guide through which said tape passes, a key having connections to move said guide and thereby carry a portion of said tape in another direction, and electrically operated devices for regularly making closely consecutive time indications on said tape.

12. In a measuring apparatus, means for feeding a record tape in the direction of its length, means for making a series of time indications on said tape, and devices for regularly moving said time indication means at an angle to the direction of the feeding movement of the tape.

13. In a measuring apparatus, means for feeding a record tape in the direction of its length, electrically operated devices for regularly making closely consecutive time indications on said tape, and automatic means for regularly moving said time indication means at an angle to the direction of the feeding movement of the tape.

14. In a measuring apparatus, means for feeding a record tape, spark terminals adjacent said tape, devices whereby said terminals may cause closely consecutive sparks regularly to pierce said tape, and automatic means for regularly moving said spark terminals at an angle to the feeding movement of said tape.

15. In a measuring apparatus, means for feeding a record tape in the direction of its length, spark terminals adjacent opposite sides of said tape, means whereby said terminals may cause closely consecutive sparks regularly to pierce said tape, and electrically operated devices for regularly moving said spark terminals at an angle to the direction of said feeding movement of the tape, said devices operating with less closely consecutive intervals than the intervals between the passage of the sparks.

16. In a measuring apparatus, means for feeding a record tape in the direction of its length, spark terminals adjacent said tape, means whereby said terminals may cause closely consecutive sparks regularly to pierce said tape, and manually operated devices constructed to move said tape at an angle to the direction of its feeding movement and relatively to said spark terminals.

17. In a measuring apparatus, means for feeding a record tape in one direction, means for regularly making on said tape closely consecutive time indications, automatic means for regularly moving said time indication means at an angle to the direction of feeding movement of said tape, and manually operated means for moving the portion of said tape adjacent said time indication means at another angle to the direction of its feeding movement.

18. In a measuring apparatus, a typewriter having a ribbon guide, means for feeding a record tape through said ribbon guide, devices for moving said guide relative to the printing point of the typewriter, and means, adjacent said ribbon guide, constructed to make regularly closely consecutive time indications on said tape.

19. In a measuring apparatus, a typewriter having a ribbon guide, means for feeding a record tape in one direction through said guide, connections from the typewriter keys to move said guide and said tape at an angle to the direction of feeding movement of said tape, and automatic means adjacent said ribbon guide, to make regularly closely consecutive time indications on said tape.

20. In a measuring apparatus, the process of measuring reaction times which consists in feeding a record tape past a record point in one direction, regularly making closely consecutive time indications on said tape at a point adjacent said record point, manually moving said record tape at an angle to the direction of its feeding movement and relative to said time indication means, and coincidentally recording the reaction under observation on the tape.

21. In a measuring apparatus, the process of measuring reaction times which consists in feeding a record tape in one direction past a record point, regularly making closely consecutive time indications on said tape at a point adjacent said record point, making a record on said tape at the record point of the reaction under observation, and by making said reaction record moving said tape at an angle to the direction of its feeding movement.

22. In a measuring apparatus, the process of measuring reaction times which consists in uniformly feeding a record tape past a record point in one direction, making regularly on said tape closely consecutive time indications at a point adjacent said record point, regularly moving said time indication means at an angle to the feeding movement of the tape, making a record on said tape of the reaction under observation, and moving the tape relative to the time indication means at another angle to its feeding movement simultaneously with the making of the reaction record.

In testimony whereof I affix my signature.

REES E. TULLOSS.